US006829289B1

(12) United States Patent
Gossett et al.

(10) Patent No.: US 6,829,289 B1
(45) Date of Patent: Dec. 7, 2004

(54) APPLICATION OF A PSEUDO-RANDOMLY SHUFFLED HADAMARD FUNCTION IN A WIRELESS CDMA SYSTEM

(75) Inventors: Carroll Philip Gossett, Mountain View, CA (US); Michial Allen Gunter, Fremont, CA (US)

(73) Assignee: Gossett and Gunter, Inc., Mountain View, CA (US)

( * ) Notice: Subject to any disclaimer, the term of this patent is extended or adjusted under 35 U.S.C. 154(b) by 337 days.

(21) Appl. No.: 09/730,697

(22) Filed: Dec. 5, 2000

(51) Int. Cl.[7] ............................................... H04J 13/04
(52) U.S. Cl. ...................... 375/141; 375/145; 375/146; 375/149; 370/209
(58) Field of Search ................................. 375/140, 141, 375/144, 145, 146, 147, 148, 149; 708/250–256; 370/203, 208, 209

(56) References Cited

U.S. PATENT DOCUMENTS 5,677,929 A * 10/1997 Asano et al. ............... 375/141
6,091,760 A * 7/2000 Giallorenzi et al. ........ 375/140
6,496,474 B1 * 12/2002 Nagatani et al. ............ 370/208
2002/0106004 A1 * 8/2002 Tan ............................. 375/140
2002/0172180 A1 * 11/2002 Hall et al. ................... 370/342

FOREIGN PATENT DOCUMENTS

| EP | 1 047 215 A2 | 10/2000 | ............ H04J/11/00 |
| WO | WO 00/01091 | 1/2000 | ............ H04B/7/216 |
| WO | WO 00/01092 | 1/2000 | ............ H04B/7/216 |

* cited by examiner

Primary Examiner—Amanda T. Le

(57) ABSTRACT

A method of improving bandwidth of wireless CDMA systems by shuffling the rows of a Hadamard function in a pseudo-random manner. A Hadamard function is used to provide orthogonality between users. The orthogonal waveforms are used to prevent interference from different users sharing the same cell as well as multiple channels from the same user. The rows of the Hadamard function are shuffled in a pseudo-random manner. This effectively maximally spreads the spectral density of the transmitted signal out across the available spectrum. These codes are precomputed and stored in lookup tables of mobile wireless devices. The data signals are modulated by one set of codes. Thereby, one data bit can be transmitted per chip.

41 Claims, 5 Drawing Sheets

APPLICATION OF A PSEUDO-RANDOMLY SHUFFLED HADAMARD FUNCTION IN A WIRELESS CDMA SYSTEM

FIELD OF THE INVENTION

The present invention relates to a method of pseudo-randomly shuffling a Hadamard function in a wireless CDMA system to dramatically improve performance.

BACKGROUND OF THE INVENTION

Wireless communications has emerged to become a huge market as millions of people world-wide buy cellular handsets, subscribe to Personal Communications Services (PCS), and make calls on a daily basis. There are many competing technologies in the wireless communications field. Initially, cellular transmissions were made according to traditional analog radio frequency (RF) technology. But as wireless digital technology improved, it became clear that digital applications were far superior to that of analog. The three dominant wireless digital technologies existing today include Global System of Mobile communications (GSM), Time Division Multiple Access (TDMA), and Code Division Multiple Access (CDMA). Of these three digital wireless technologies, CDMA is gaining widespread popularity because of its many advantages.

Generally, CDMA offers greater signal quality, resulting in clearer calls. In addition, CDMA utilizes a spread-spectrum approach, which makes it ideal for deployment in dense urban areas where multi-pathing is an issue. This results in fewer dropped calls. Furthermore, CDMA technology is more power efficient, thereby prolonging the standby and active battery life. But one of the most attractive features of CDMA is that it offers a greater capacity for carrying signals. Basically, the airwaves are divided into a number of different frequency bands per Federal Communications Commission (FCC) regulations. A limited segment of the airwaves has been allocated by the FCC for cellular usage. Due to the huge demand for cellular usage and the limited bandwidth that is available, getting a license from the FCC to transmit on a particular frequency band is extremely expensive. By increasing capacity, CDMA enables PCS providers to carry more users per channel. This increased capacity directly translates into greater revenue for cellular companies.

The advantages of CDMA carry over into high-speed wireless digital access. Increasingly, wireless digital applications are being used to access digital data (e.g., the Internet, intranet, multimedia, business data, etc.) at high speeds. With high speed wireless access, mobile users can obtain instant access to the Internet, business data (e.g., stock market quotes, sales reports, inventory information, price checks, customer data, emails, pages, etc.), and other real time data (e.g., traffic updates, weather information, sports news, etc.). The goal is to provide cellular handsets, personal digital assistants, portable communications devices, etc. the ability to transmit and receive digital data as well as make conventional telephone calls. The trend is towards ever faster mobile data speeds to meet customer demands. With greater data speeds, it is possible to provide even more data to more users. Recent CDMA based standards such as IS-95 and 3G are proposing increased data rates and capabilities. Although CDMA offers superior capacity over that of competing wireless analog and digital technologies, the capacity at which data can be conveyed is approaching the maximum bounds that can be delivered by conventional CDMA technology.

Therefore, there is a need to somehow increase the capacity at which data can be delivered through wireless digital technology. The present invention provides a unique, novel solution which improves the capacity of CDMA by a factor of four.

SUMMARY OF THE INVENTION

The present invention pertains to a method of pseudo-randomly shuffling the rows of a Hadamard function in a wireless CDMA system to dramatically improve performance. A Hadamard function is used to provide orthogonality between users. The orthogonal waveforms are used to prevent interference from different users sharing the same cell and to allow the bandwidth from multiple channels to be aggregated. The rows of the Hadamard function are shuffled in a pseudo-random manner. This effectively maximally spreads the spectral density of the transmitted signal out across the available spectrum. Sets of these pre-computed pseudo-randomly shuffled Hadamard codes are stored in lookup tables of mobile wireless devices. During transmission, a code is supplied by the lookup table, and the data signal is then modulated by that particular code. Consequently, by aggregating multiple orthogonal channels, one data bit can be transmitted per chip, which substantially improves the rate by which data can be transmitted. The receiver then demodulates the received signal by a corresponding code stored in its lookup table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for improving the bandwidth of wireless CDMA systems by using a pseudo-randomly shuffled Walsh-Hadamard code is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

In contrast to Frequency Division Multiple Access (FDMA), which allocates the frequency band into a number of frequency slots, or Time Division Multiple Access (TDMA), which allocates the frequency band into pre-defined intervals of time in which users are allowed to use, Code Division Multiple Access (CDMA) gives the right to use the frequency band to all users simultaneously all the time. This is enabled by using a technique known as "spread spectrum." Each user is assigned a code which spreads its signal bandwidth in such a way that only the same code can recover it at the receiver end. This technique has the property that the unwanted signals with different codes appear to be "noise" to the receiver. Basically, spread spectrum is a means of transmission whereby the data occupies a larger bandwidth than necessary. Bandwidth spreading is accomplished before the transmission through the use of a code which is independent of the transmitted data. The same code is then used to demodulate the data at the receiving end. As such, spread spectrum modulations is ideal for use in dense, urban areas where there is a great amount of interference.

Figure 1:
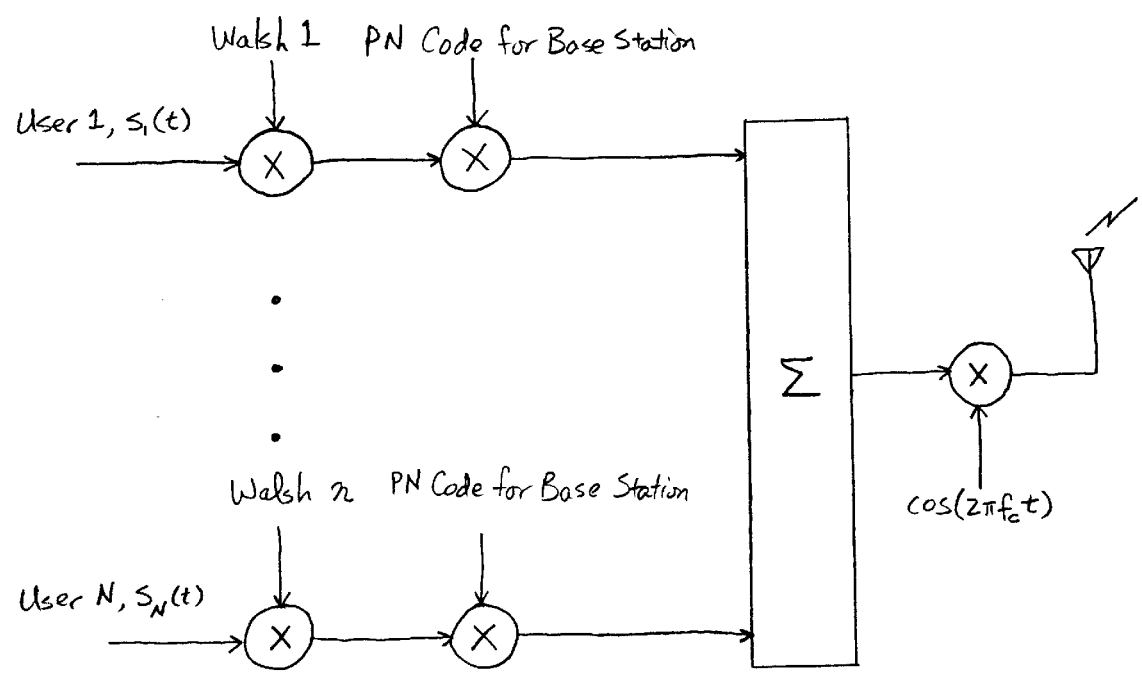
FIG. 1 shows a prior art CDMA base station system using Walsh functions and a separate pseudo-random code.

FIG. 1 shows a prior art CDMA base station system using Walsh functions and a separate pseudo-random code. User signals (e.g., digitized voice signals or digital packetized data) are first modulated by a Walsh function. As stated above, one advantage of CDMA for personal communication services is its ability to accommodate many users on the same frequency at the same time. This is accomplished by assigning a specific code to each user. Only that particular code can demodulate the transmitted signal for that particular user. More specifically, each user is assigned an orthogonal code. Since the codes are orthogonal, users with different codes do not interfere with each other. One important set of orthogonal codes is the "Walsh" set. Walsh functions are generated using an iterative process of constructing a "Hadamard" matrix. Starting with $H1=[0]$, the Hadamard matrix is built by:

$$H_{2n} = \begin{pmatrix} H_n & H_n \\ H_n & \overline{H}_n \end{pmatrix}$$

For example, the Walsh codes of lengths two and four are shown respectively as:

$$H_2 = \begin{pmatrix} 0 & 0 \\ 0 & 1 \end{pmatrix}$$

$$H_4 = \begin{pmatrix} 0 & 0 & 0 & 0 \\ 0 & 1 & 0 & 1 \\ 0 & 0 & 1 & 1 \\ 0 & 1 & 1 & 0 \end{pmatrix}$$

From the corresponding matrices shown above, the Walsh codewords are given by the rows. These Walsh codes are important because they form the basis for orthogonal codes with different spreading factors. This property is useful when signals with different spreading factors share the same frequency channel. The period of time needed to transmit a single modulation symbol is called a Walsh symbol interval and is equal to $1/4800$ second (i.e., 208.33 $\mu$s). The period of time associated with $1/64$ of the modulation symbol is referred to as a Walsh "chip" and is equal to $1/307,200$ (i.e., 3.255)

For the forward channel, the Walsh functions are used to eliminate multiple access interference among users in the same cell. This can be achieved due to the orthogonality of the waveforms. All users within the same cell are synchronized since the waveforms maintain orthogonality if they are aligned in time. Referring to FIG. 1, the input data (e.g., digitized human speech or packetized data) is modulated by one of the orthogonal Walsh functions. Next, the signal is modulated by the pseudo-random number code. A chip rate for running the pseudo-random number is 1.2288 Mega chips per second (Mcps). Finally, all users of that cell are summed and transmitted on the carrier.

Figure 2:
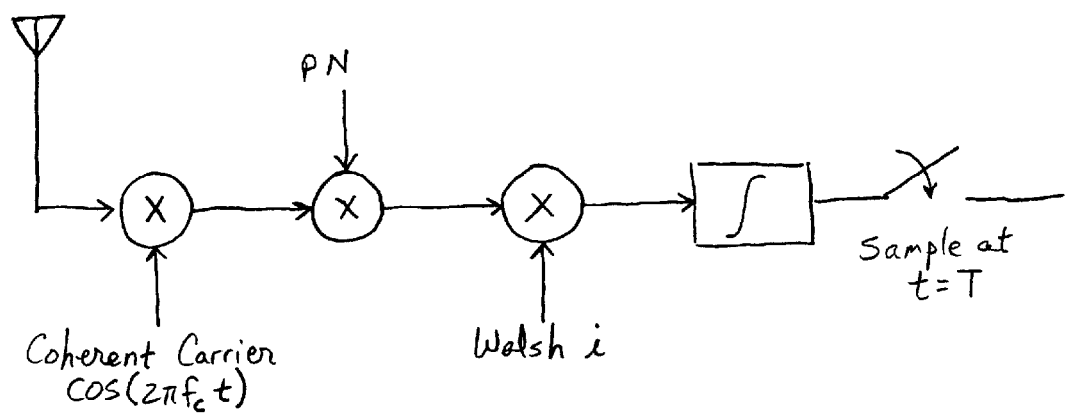
FIG. 2 shows a prior art CDMA process in a mobile station.

FIG. 2 shows a prior art CDMA process in a mobile station. First, the coherent carrier is removed. Next, the signal is demodulated by multiplying it with the synchronized pseudo-random number. This is the same pseudo-random number associated with the base station. Finally, the signal is multiplied by the synchronized Walsh function in order to eliminate interference due to other users' transmission within that cell.

In the prior art, it is widely recognized that the Walsh-Hadamard codes do not exhibit the optimal spreading behavior. These codes do not spread data as well as pseudo-random sequences because their power spectral density is concentrated in a small number of discrete frequencies. As such, the prior art designs have two separate modulation steps. One is used to multiply the input data signal by the Walsh-Hadamard function in order to eliminate interference. And a second, separate multiplication occurs when the signal is modulated by the pseudo-random number generator in order to provide better spectrum spreading. As shown above, the rate by which the signal is modulated by the Walsh/Hadamard function is one-quarter that of the rate by which the signal is modulated by the pseudo-random number (i.e., 307.219kHz versus 1.2288 MHz). The modulation is run at two different rates in order to minimize DC biasing. However, this translates into having a single data bit being transmitted every four chips.

The present invention transmits one data bit per chip. Essentially, this means that the present invention improves the bandwidth by a factor of four. Four times the amount of information can be transmitted as compared with that of the prior art CDMA schemes. The present invention improves the efficiency of CDMA systems by 400 percent. The method by which this improvement is accomplished entails generating a Walsh/Hadamard function and scrambling its rows. The Walsh/Hadamard function is used to eliminate interference between users on the same cell according its physical properties as described above. However, by scrambling the rows, the spectral density is spread out. The signal is thereby maximally spread out. By scrambling the rows, one can achieve the same effect as was achieved in the prior art of modulating the signal with a pseudo-random number. The scrambled Walsh/Hadamard function achieves both objectives in a single modulation step. Thus, by using the present invention, one bit of user information can be transmitted per chip.

Figure 3:
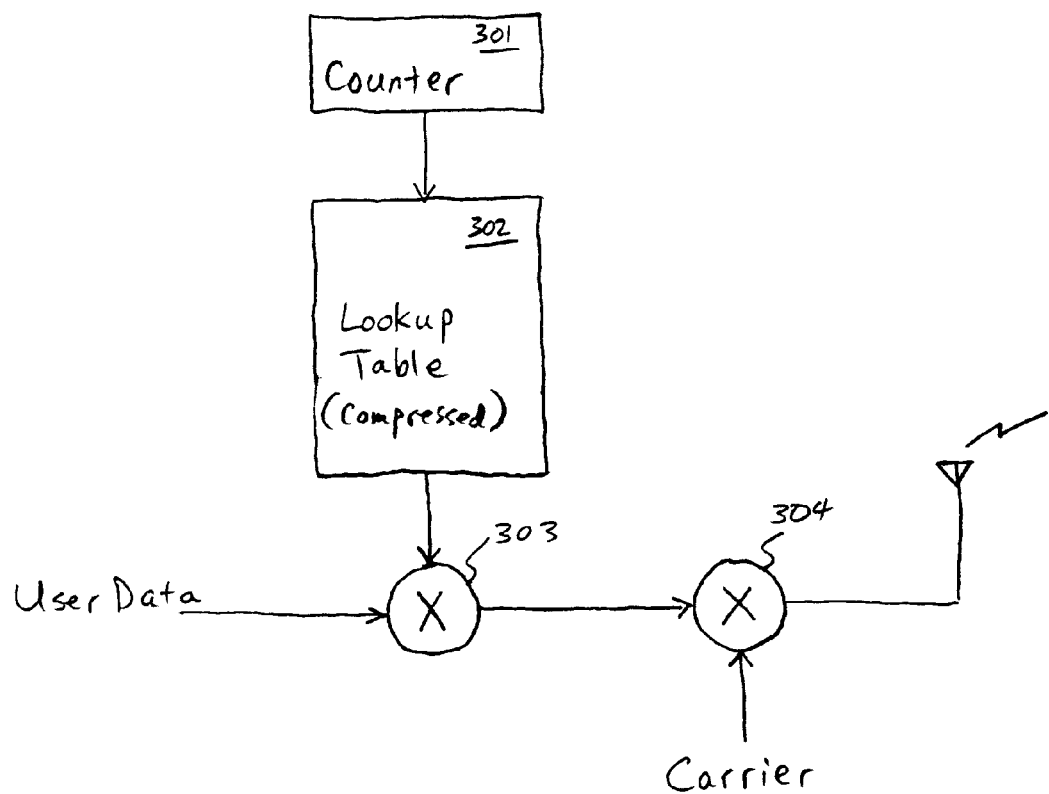
FIG. 3 shows the currently preferred embodiment of a coding scheme for a CDMA transmitter according to the present invention.

FIG. 3 shows the currently preferred embodiment of a coding scheme for a CDMA transmitter according to the present invention. A memory chip contains a lookup table 302. The lookup table comprises a pre-generated set of codes. These codes correspond to a Walsh/Hadamard function with pseudo-randomly scrambled rows. In the currently preferred embodiment, rather than storing a $2^N$ by $2^N$ scrambled Hadamard function, a more efficient code is stored by using lossless compression. It has been recognized that one property of a Hadamard matrix is that each column is the XOR of the power-of-two numbered columns with a corresponding set bit in the selected channel code number. Thereby, one can compress the Hadamard matrix by storing only the power-of-two numbered columns. In other words, the pseudo-randomly shuffled Hadamard matrix can be compressed and stored as an N by $2^N$ matrix. To recover all desired columns of the original matrix, one can XOR together the columns corresponding to the bits set to "1" in the desired column number. Then, constructively take the output of the table, bit-wise AND the table output with the channel select code (both N bits) and XOR the resulting N bits together. User data, such as digitized speech or packetized data, is input to multiplier 303. The user data is modulated by multiplying the user data with one of the codes contained within the lookup table 302 by multiplier 303. The resulting signal is then transmitted on a carrier 304 by means of an RF transmitter. A counter 301 is used as a pointer into the lookup table, which enables multiple users to transmit on the same cell. In the currently preferred embodiment, the modulation occurs at 1.2288 Mega chips per second with one data bit being transmitted per chip.

Figure 4:
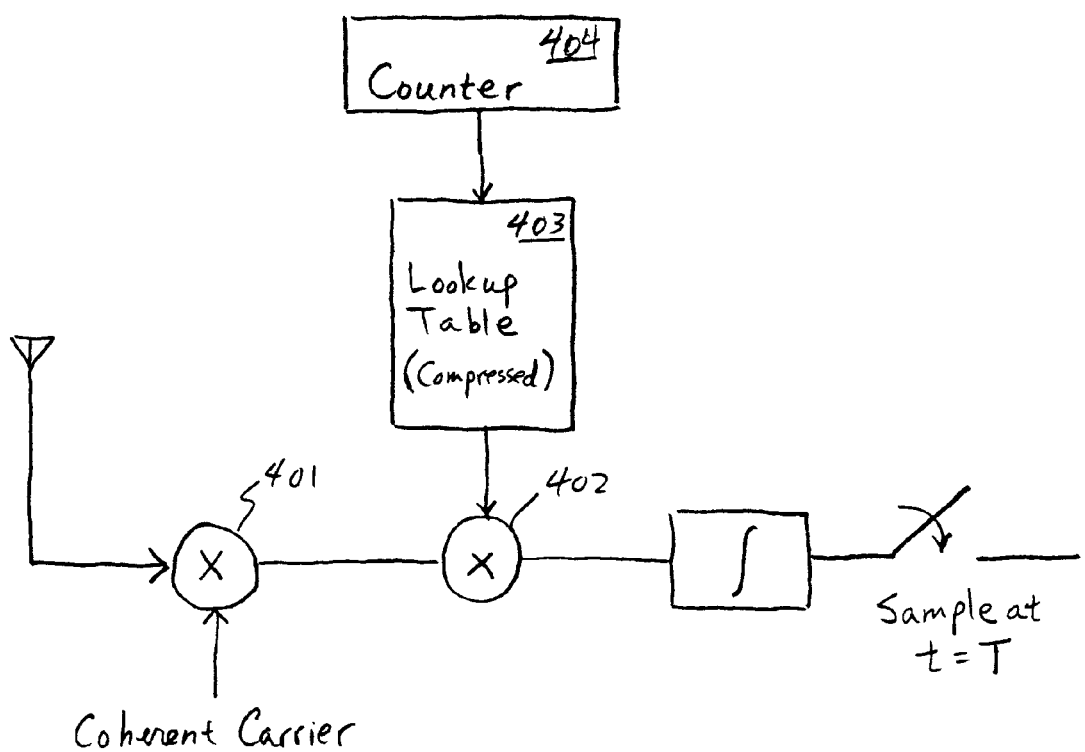
FIG. 4 shows the currently preferred embodiment of a de-coding scheme for a CDMA receiver according to the present invention.

FIG. 4 shows the currently preferred embodiment of a de-coding scheme for a CDMA receiver according to the present invention. First, the carrier is removed from the received signal by multiplier 401. Next, multiplier 402 is used to demodulate the received signal according to matching code stored in lookup table 403. A memory chip (DRAM, SRAM, FLASH, ROM, etc.) contains the same lookup table as that of the transmitting CDMA system. In other words, the lookup table has the identical Walsh/Hadamard codes with its rows scrambled same as that of the corresponding transmitter. The contents of lookup table 403 of the receiver shown in FIG. 4 is exactly the same as the contents of the lookup table 302 of the transmitter shown in FIG. 3. A counter 404 is used as a pointer to the code which is to be used in lookup table 403. The two counters (i.e., counter 301 in the transmitter and counter 404 of the receiver) are synchronized in time. This synchronization maintains orthogonalty and enables the receiver to correlate the Walsh/Hadamard codes. The synchronization is achieved by transmitting a pilot signal to enable the receiver to recover synchronization, or by other methods (e.g., servoing to correlation peaks in the coded data stream).

As stated above, the present invention entails scrambling the rows of the traditional Walsh/Hadamard function. More specifically, the rows are shuffled by a random integer sequence. The resulting codes are unique in that the same codes are not used twice. These codes are then stored in the lookup table. In the currently preferred embodiment, the lookup table is 14×16 k size (i.e., fourteen bits by 16 k). An exemplary set of compressed Walsh/Hadamard codes with randomized codes is shown in Appendix A. Note that the compressed codes of the 14 bits by 16 k words has the least significant seven bits repeated in the two 8 k halves of the table (but still requires each 14 bit number to appear once only). Furthermore, in one embodiment, the present invention can readily be adapted to work on traditional wireless CDMA handsets. An exemplary 8 bit by 256 word compressed pseudo-randomly shuffled Hadamard matrix which can be used for traditional CDMA applications is shown in Appendix B.

There are several advantages by implementing the randomized Walsh/Hadamard function. Namely, one can obtain four times the number of codes in the same bandwidth as compared with that of the prior art. By aggregating multiple channels coded with each of the orthogonal codes, the data rates can be effectively increased by a factor of four. Furthermore, making better use of the air waves translates into lower costs. In addition, the present invention is primarily DC free (although this is not strictly necessary). This eliminates problems associated with DC biasing. Another advantage of the present invention is that the rows can be shuffled such that the signal spectrum is maximally spread so as to not violate FCC regulation. Maximally spreading the signal across all bands (120 kHz) means that one can broadcast with a higher overall power output. This results in greater reliability, further range, improved signal-to-noise ratio, and better signal quality.

It should be noted that the present invention can be applied to any modulation scheme, either wireless or hardwired, which utilizes a spread-spectrum technique. In particular, the present invention can be applied to CDMA cellular handsets as well as other wireless mobile CDMA devices or appliances. Current cell phones can be modified to use the present invention with minimal cost to achieve a huge performance gain. Moreover, the present invention can be expeditiously applied to peer-to-peer wireless applications. Furthermore, although the description set forth above is directed to a Walsh/Hadamard function, the present invention can use any orthogonal function and is not limited to Walsh/Hadamard.

Figure 5:
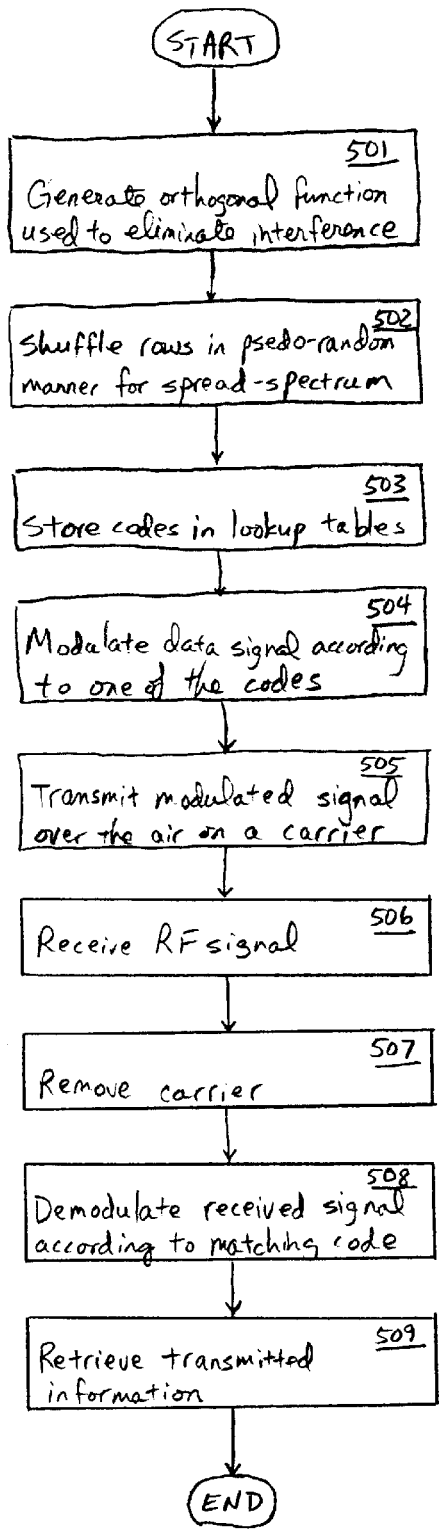
FIG. 5 is a flowchart describing the steps for the improved coding scheme as applied to a CDMA system according to the present invention.

FIG. 5 is a flowchart describing the steps for the improved coding scheme as applied to a CDMA system according to the present invention. Initially, an orthogonal function is used, step 501. Each user is assigned to a unique code. This is done so that the resulting orthogonal waveforms of the different users do not interfere with one another. In the currently preferred embodiment, a Hadamard function is used. The Hadamard function is a Walsh function which contains one row of all 0's, with the remaining rows each having an equal number of 1's and 0's. The rows of this Hadamard function are then shuffled in a pseudo-random manner, step 502. This is done so that the spectral density of the resulting transmitted RF signal is maximally spread across the available spectrum. The codes are then stored in lookup tables, step 503. Each mobile wireless device assigned to a particular cell has a lookup table containing the same set of codes and the base station (if any) also contains the same set of codes for that cell. It should be noted that the codes are pre-computed once and stored in the lookup tables; they need not be regenerated. Furthermore, in the currently preferred embodiment, the lookup tables exist in a compressed form, by taking advantage of the property of Hadamard matrices that each column is the exclusive-or (XOR) of the power-of-two numbered columns with a corresponding set (i.e. to "1") bit in the selected channel code number.

Consequently, for transmissions, the data signal is modulated by one of the codes found in the lookup table, step 504. The modulated signal is then broadcast over the air on a carrier, step 505. The RF signal is received by the intended mobile device, step 506. The carrier is removed, step 507. And the received signal is then demodulated according to a matching code derived from the receiver's lookup table, step 508. The transmitted information can then be extracted, step 509.

In one embodiment of the present invention, the data stream is parallelized by aggregating n number of channels. Aggregation of multiple channels yields greater bandwidth. For example, one can aggregate 32 channels to transmit a 32-bit word; aggregate 64 channels to transmit 64 bits; aggregate 128 channels to transmit 128 bits in parallel, etc. (one channel for each bit). In the currently preferred embodiment, combinations and variations of 64, 128, 256, 512, 1024, 2048, 4096, 8192, 16384, etc. channels can be aggregated together. By aggregating 16 K or greater number of channels, one can approach transmission of one data bit per chip. Furthermore, ECC bits can be aggregated. The improved efficiencies provided by the shuffled Hadamard function described above grants CDMA designers additional margin to aggregate greater numbers of channels together for improved bandwidth.

Therefore, a method of improving bandwidth of wireless CDMA systems by shuffling the rows of a Walsh/Hadamard function in a pseudo-random manner has been disclosed. It should be noted that although the present invention has been described with reference to wireless and RF technology, the present invention is applicable to wired technologies as well (e.g., cable, transmission lines, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A spread-spectrum system comprising:
    a memory having a set of codes corresponding to an orthogonal function which has been arranged in a pseudo-random manner;
    a modulator coupled to the memory which modulates an information signal according to one of the codes stored in the memory;
    an RF transmitter which transmits the modulated signal on a carrier over the air, wherein the memory stores the set of codes in a lookup table and wherein the codes comprise N by $2^N$ memory of compressed codes.

2. The spread-spectrum system of claim 1, wherein the codes are compressed by storing only the power-of-two columns of a pseudo-randomly shuffled Hadamard matrix.

3. The spread-spectrum system of claim 1, wherein the same set of codes are stored on a plurality of wireless devices.

4. The spread-spectrum system of claim 1, wherein the codes correspond to a Hadamard function.

5. The spread-spectrum system of claim 4, wherein the rows of the Hadamard function are shuffled in a pseudo-random manner.

6. The spread-spectrum system of claim 5, wherein the codes are shuffled to maximally spread the spectral density of the transmitted signal across the spectrum.

7. The spread-spectrum system of claim 1, further comprising the implementation of a Code Division Multiple Access (CDMA) technique.

8. The spread-spectrum system of claim 1, wherein the information signal comprises digitized speech.

9. The spread-spectrum system of claim 1, wherein the information signal comprises packetized data.

10. The spread-spectrum system of claim 1, wherein the memory stores the set of codes in a lookup table.

11. The spread-spectrum system of claim 1, further comprising a counter which is incremented to select which of the sets of codes stored in the memory is used to modulate the information signal.

12. The spread-spectrum system of claim 1, wherein modulation of the information signal by the code is DC free.

13. The spread-spectrum system of claim 1, wherein one data bit is transmitted per chip.

14. The spread-spectrum system of claim 1, wherein the RF transmitter transmits to a receiver on a peer-to-peer basis.

15. The spread-spectrum system of claim 1, further comprising aggregating more than 64 channels.

16. The spread-spectrum system of claim 1, further comprising aggregating more than 128 channels.

17. The spread-spectrum system of claim 1, further comprising aggregating more than 256 channels.

18. The spread-spectrum system of claim 1 further comprising aggregating more than 512 channels.

19. The spread-spectrum system of claim 1 further comprising aggregating more than 1024 channels.

20. The spread-spectrum system of claim 1, further comprising aggregating more than 2048 channels.

21. The spread-spectrum system of claim 1, further comprising aggregating more than 4096 channels.

22. The spread-spectrum system of claim 1, further comprising aggregating more than 8192 channels.

23. In a wireless spread-spectrum system, a method of modulating a signal comprising the steps of:
    generating a plurality of codes which are orthogonal;
    arranging the codes in a pseudo-random manner;
    compressing the codes and storing compressed codes in a lookup table; wherein the codes are compressed by storing only the power-of-two numbered columns of a pseudo-randomly shuffled Hadamard matrix;
    modulating a data signal according to the codes; and
    transmitting the modulated data signal on a carrier.

24. The method of claim 23, further comprising the steps of:
    storing codes in a receiver which match the codes stored on a transmitter;
    demodulating a received signal according to a same code which was used to modulate the received signal.

25. The method of claim 23, wherein the codes correspond to a Walsh function.

26. The method of claim 25, further comprising the step of shuffling rows of the Walsh function to arrange the codes in the pseudo-random manner.

27. The method of claim 26, wherein the codes are shuffled to maximally spread the data signal in an RF spectrum.

28. The method of claim 23, further comprising the step transmitting signals according to a Code Division Multiple Access (CDMA) technique.

29. The method of claim 23, wherein the data signal comprises digitized speech.

30. The method of claim 23, wherein the data signal comprises packetized data.

31. The method of claim 23, further comprising the step of storing the plurality of codes in a lookup table.

32. The method of claim 23, further comprising the step of transmitting one data bit per chip.

33. The method of claim 23, further comprising the step of aggregating more than 64 channels.

34. The method of claim 23, further comprising the step of aggregating more than 128 channels.

35. The method of claim 23, further comprising the step of aggregating more than 256 channels.

36. The method of claim 23, further comprising the step of aggregating more than 512 channels.

37. The method of claim 23, further comprising the step of aggregating more than 1024 channels.

38. The method of claim 23, further comprising the step of aggregating more than 2048 channels.

39. The method of claim 23, further comprising the step of aggregating more than 4096 channels.

40. The method of claim 23, further comprising the step of aggregating more than 8192 channels.

41. The method of claim 25, further comprising the step of aggregating more than 16384 channels.

* * * * *